United States Patent
Bonomi et al.

(10) Patent No.: US 10,868,754 B2
(45) Date of Patent: Dec. 15, 2020

(54) HIGH AVAILABILITY INPUT/OUTPUT MANAGEMENT NODES

(71) Applicant: Nebbiolo Technologies Inc., Milpitas, CA (US)

(72) Inventors: Flavio Bonomi, Milpitas, CA (US);
Chandra Joshi, Milpitas, CA (US);
Kannan Devarajan, Milpitas, CA (US);
Pankaj Bhagra, Milpitas, CA (US);
Palani Chinnakannan, Milpitas, CA (US)

(73) Assignee: NEBBIOLO TECHNOLOGIES INC.CA (US)

( * ) Notice: Subject to any disclaimer, the term of this patent is extended or adjusted under 35 U.S.C. 154(b) by 156 days.

(21) Appl. No.: 15/334,287

(22) Filed: Oct. 26, 2016

(65) Prior Publication Data
US 2018/0115457 A1 Apr. 26, 2018

Related U.S. Application Data

(60) Provisional application No. 62/287,687, filed on Jan. 27, 2016.

(51) Int. Cl.
*H04L 12/707* (2013.01)
*H04L 12/24* (2006.01)
*H04L 12/703* (2013.01)

(52) U.S. Cl.
CPC .......... *H04L 45/22* (2013.01); *H04L 41/0631* (2013.01); *H04L 41/0663* (2013.01); *H04L 45/28* (2013.01); *H04L 41/0806* (2013.01)

(58) Field of Classification Search
CPC ... H04L 41/0668; H04L 45/22; H04L 67/125; H04L 43/0817; H04L 41/0631;
(Continued)

(56) References Cited

U.S. PATENT DOCUMENTS 5,630,053 A 5/1997 Morikawa
6,370,656 B1 4/2002 Olarig et al.
(Continued)

FOREIGN PATENT DOCUMENTS

EP 2800303 11/2014

OTHER PUBLICATIONS

Holloway, Talor, "IBM PowerHA 7.1 heartbeat over SAN," Jan. 21, 2013, https://www.ibm.com/developerworks/aix/library/au-aix-powerha-heartbeat/index.html.*
(Continued)

*Primary Examiner* — John A Follansbee
*Assistant Examiner* — Lam T Do
(74) *Attorney, Agent, or Firm* — Barry Choobin; Patent 360 LLC

(57) ABSTRACT

Disclosed herein are enhancements for operating an input/output (I/O) management cluster with end I/O devices. In one implementation, a method of operating an I/O cluster includes, in a first I/O management node of the I/O management cluster, executing a first application to manage data for an I/O device communicatively coupled via at least one switch to the first I/O management node. The method further provides identifying a failure in the first I/O management node related to processing the data for the I/O device and, in response to the failure, configuring the at least one switch to communicate the data for the I/O device with a second I/O management node of the I/O management cluster. The method also includes, in the second I/O management node and after configuring the at least one switch, executing a second application to manage the data for the I/O device.

9 Claims, 12 Drawing Sheets

(58) Field of Classification Search
CPC ............. H04L 41/0663; H04L 41/0806; H04L 41/065; H04L 41/0893; H04L 41/12; H04L 67/1097; H04L 49/70; H04L 41/0816; H04L 41/06; H04L 45/28; G06F 3/0653; G06F 3/067; G06F 3/0619; G06F 2009/4557; G06F 11/3006; G06F 11/3055
See application file for complete search history.

(56) References Cited

U.S. PATENT DOCUMENTS

| | | | | |
|---|---|---|---|---|
| 6,763,479 | B1* | 7/2004 | Hebert | G06F 11/2005 714/4.11 |
| 9,842,013 | B2* | 12/2017 | Arjun | G06F 11/0757 |
| 2002/0156888 | A1* | 10/2002 | Lee | H04L 41/0856 709/224 |
| 2003/0131177 | A1* | 7/2003 | Ng | G06F 13/4022 710/313 |
| 2004/0128370 | A1* | 7/2004 | Kortright | H04L 41/082 709/221 |
| 2004/0205388 | A1 | 10/2004 | Nakano | |
| 2006/0206602 | A1* | 9/2006 | Hunter | H04L 49/557 709/223 |
| 2007/0083625 | A1* | 4/2007 | Chamdani | H04L 49/40 709/223 |
| 2008/0250042 | A1* | 10/2008 | Mopur | G06F 11/008 |
| 2009/0031181 | A1* | 1/2009 | Yuan | G06F 11/25 714/741 |
| 2009/0070617 | A1* | 3/2009 | Arimilli | G06F 1/10 713/400 |
| 2011/0103259 | A1* | 5/2011 | Aybay | H04L 49/35 370/254 |
| 2014/0006594 | A1* | 1/2014 | Gabriel | H04L 43/10 709/224 |
| 2014/0032173 | A1* | 1/2014 | Kida | G06F 11/0751 702/183 |
| 2015/0271642 | A1* | 9/2015 | Raymond | H04W 4/023 455/456.1 |
| 2015/0280969 | A1* | 10/2015 | Gates | G06F 11/30 714/37 |
| 2016/0124819 | A1* | 5/2016 | Killadi | G06F 11/2005 714/4.12 |
| 2016/0210209 | A1* | 7/2016 | Verkaik | G06F 11/2033 |
| 2016/0224277 | A1* | 8/2016 | Batra | G06F 3/0653 |
| 2017/0026291 | A1* | 1/2017 | Smith | H04L 45/12 |
| 2017/0116097 | A1* | 4/2017 | Keremane | G06F 11/2069 |
| 2017/0284839 | A1* | 10/2017 | Ojala | H04L 67/12 |

OTHER PUBLICATIONS

Singh, Suman Kumar, Loderup, Morten, Noman, Farrukh, "Building High-Availabiltiy Clusters," Oct. 2004, http://www.dell.com/downloads/global/power/ps4q04-20040151-singh.pdf.*

Cisco, "Cisco Nexus 7000 Series Supervisor Module;" 1992, http://www.floralimited.com/Files/Products/CISCO/BrochureUrl/Cisco_7000_Supervisor_Module(2).pdf.*

Rajabali, Taha, "How to Increase System Availabiity without Redundancy;" Dec. 8, 2013, https://web.archive.org/web/20131208193132/https://www.bastiansolutions.com/blog/index.php/2013/04/19/how-to-increase-system-availability-without-redundancy/#.Wp1x3TN96n8.*

VMWare, "How VMware HA Works;" Feb. 15, 2016, https://web.archive.org/web/20160215231257/https://pubs.vmware.com/vsphere-4-esx-vcenter/index.jsp?topic=/com.vmware.vsphere.availability.doc_41/c_useha_works.html.*

Notification of Transmittal of the International Search Report and Written Opinion for PCT/US/2017/015045, dated Apr. 26, 2017, 16 pages.

* cited by examiner

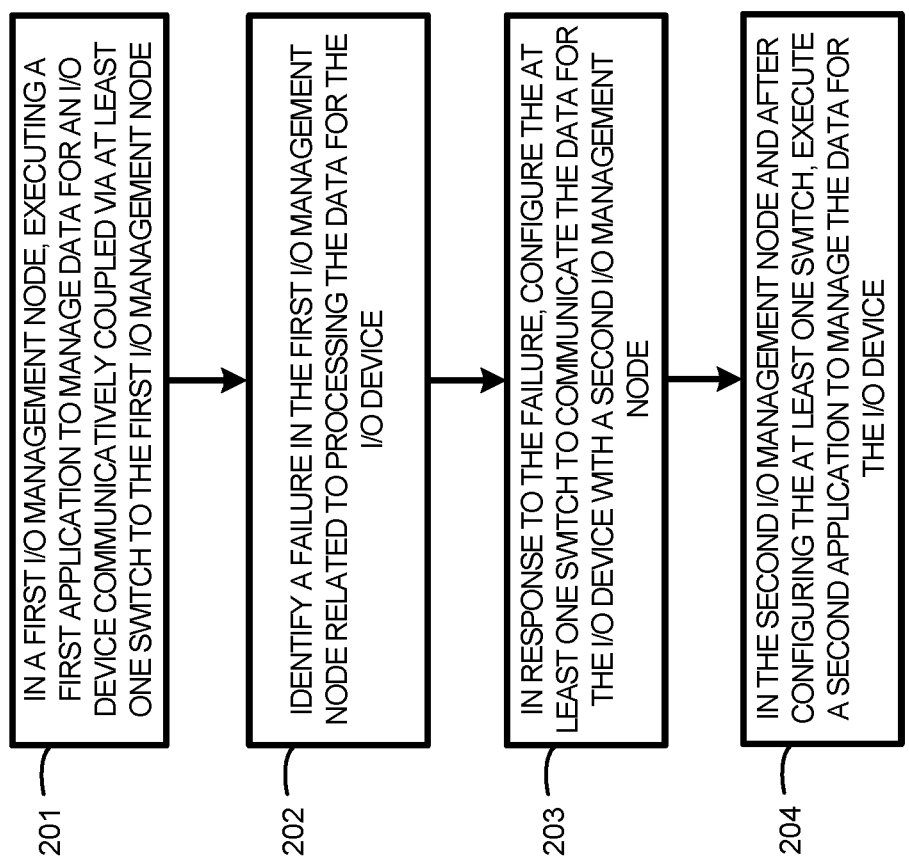

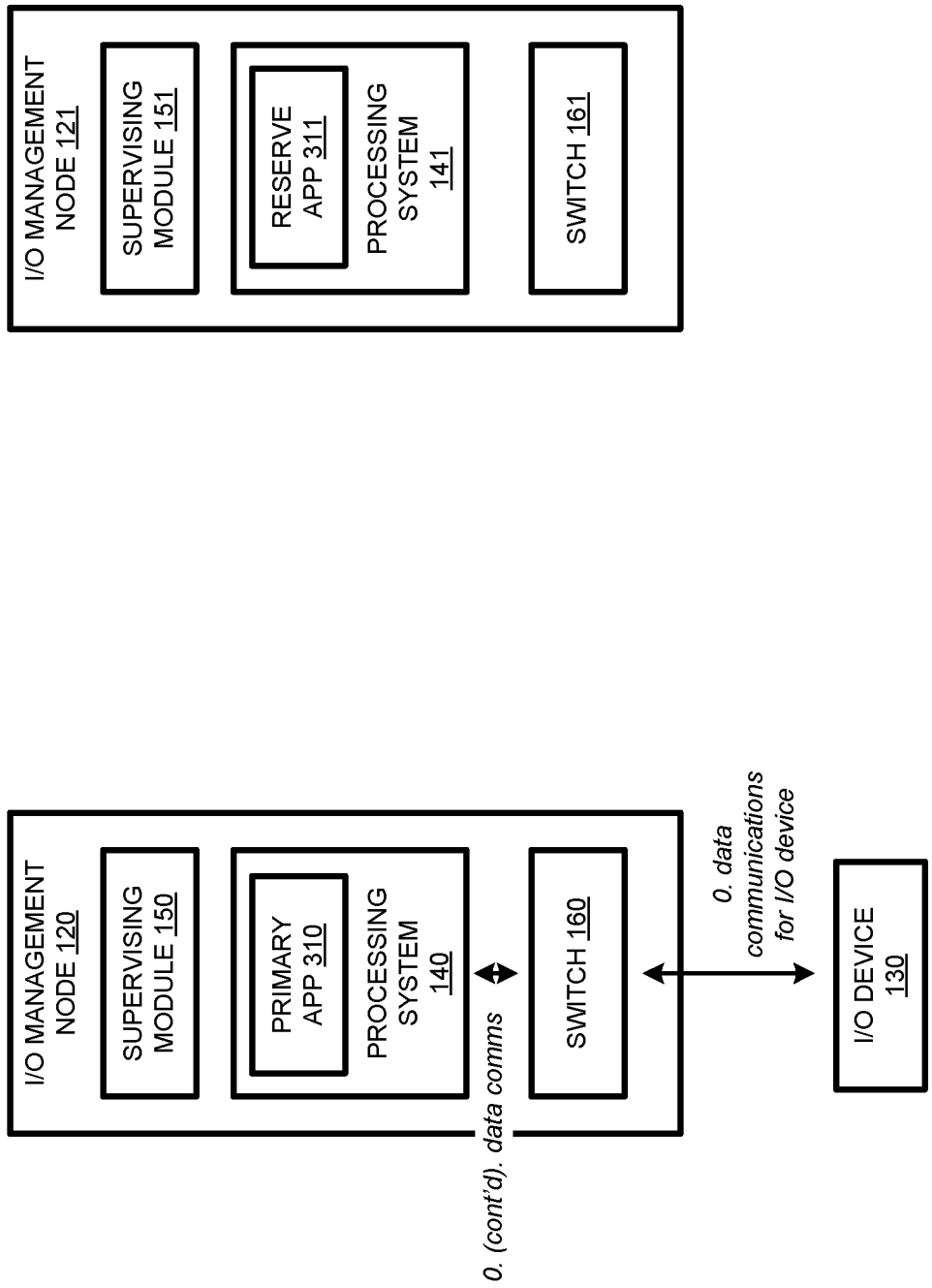

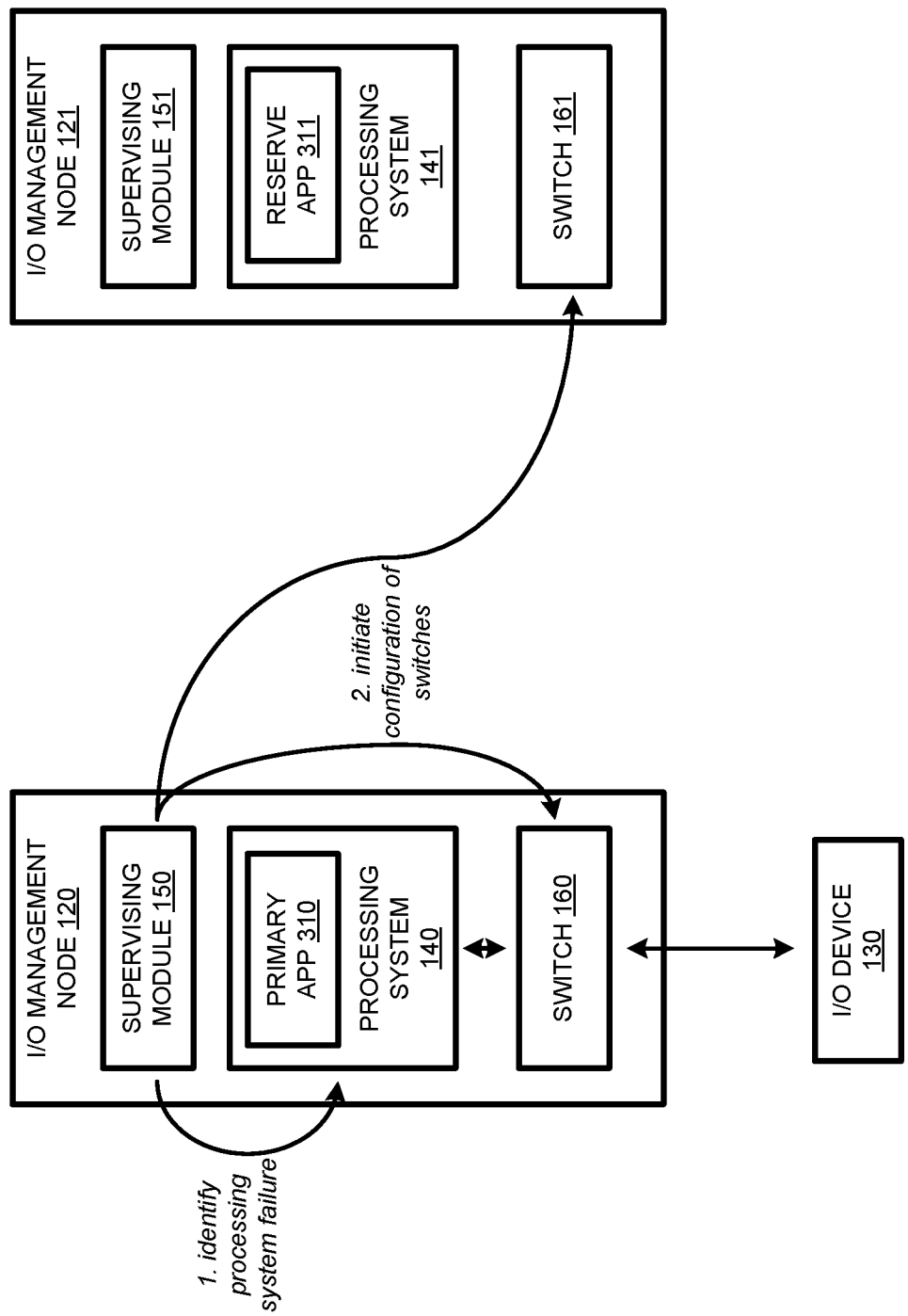

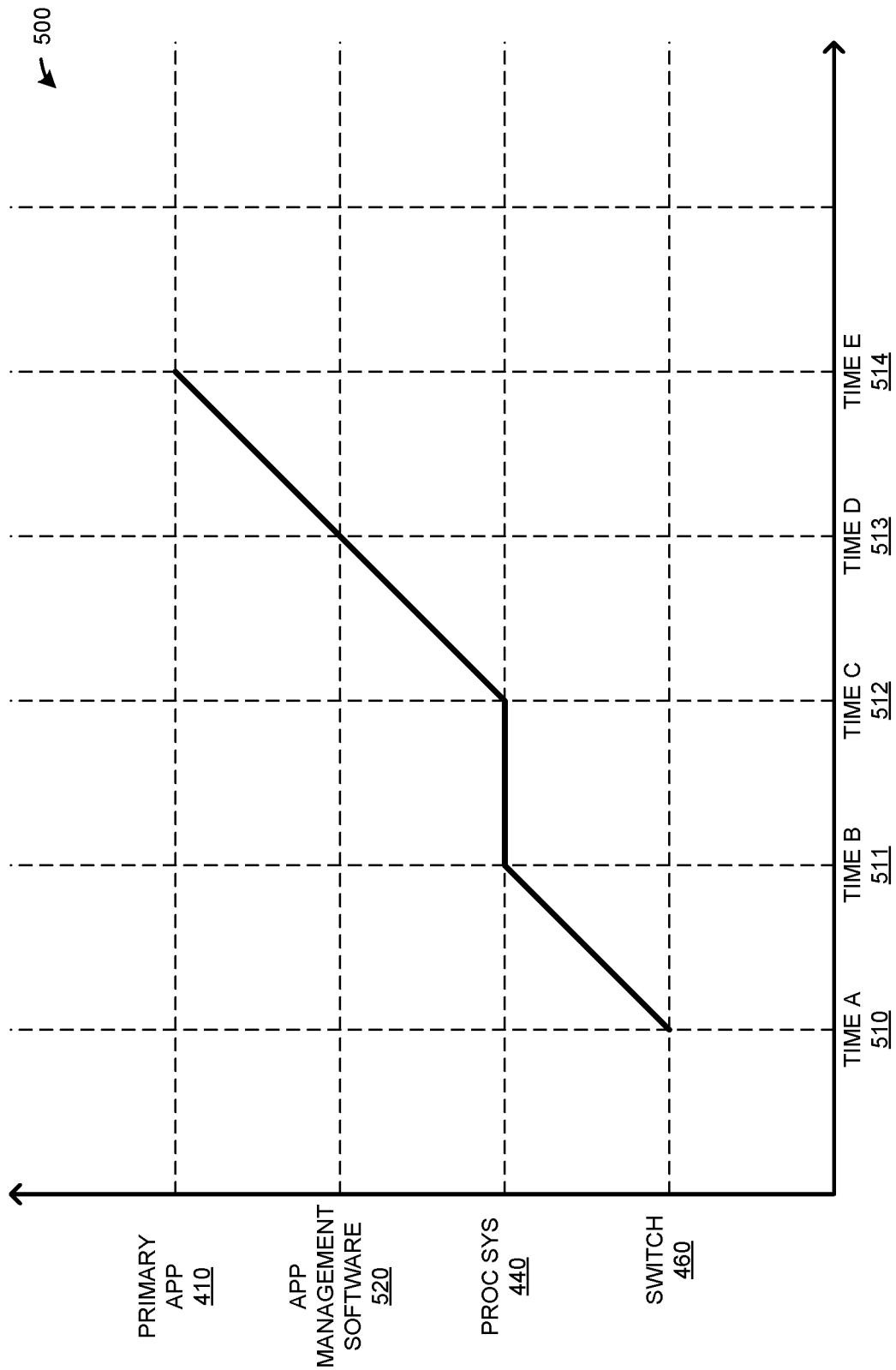

HIGH AVAILABILITY INPUT/OUTPUT MANAGEMENT NODES

RELATED APPLICATIONS

This application claims the benefit of, and priority to, U.S. Provisional Patent Application No. 62/287,687, entitled "COMPUTING SYSTEM INCORPORATING A FOG NODE," and filed on Jan. 27, 2016, which is hereby incorporated by reference in its entirety.

TECHNICAL BACKGROUND

The Internet is the global network that interconnects a variety of networks together to provide network connectivity to different technology domains like manufacturing industry, food and agriculture industry, smart cities, power plant and energy industry, transportation industry, tourism and hotel management, and the like. These technology domains operating at the edge of the network contain devices that require manageability, quality and performance metric measurement and analysis, condition monitoring for the purpose of constantly evaluating the health of the systems, optimizing the cost, maximizing the productivity and predict failures and maintenance requirements of domains. In addition, the data measured in any domain is useful to related industries in the same domain or interfacing domains. In short, the devices at the edge of the network in different domains benefit from being transformed into an intelligent, interconnected, and interoperating set of smart edge entities.

In some implementations, the edge devices may comprise input/output (I/O) devices, such as sensors, actuators, robotic elements, and the like. These devices often require real-time management and observation by processing systems to determine if each of the I/O devices are operating as per design, and perform operations on the data obtained and/or delivered to each of the I/O devices. For example, with regards to a temperature sensor at a manufacturing factory, it is desirable to have consistent real-time measurements of the temperature, as well as ensure that the sensor is operating as per design. However, managing the different I/O devices, and ensuring high availability of each of the I/O devices can be difficult and cumbersome. This task increases in difficulty as I/O devices are placed over larger physical areas that encompass one or more computing networks.

OVERVIEW

Examples disclosed herein provide enhancements of providing high availability of processing resources to input/output devices. In one implementation, a method of operating an input/output (I/O) management cluster with a plurality of I/O management nodes, includes, in a first I/O management node of the plurality of I/O management nodes, executing a first application to manage data for an I/O device communicatively coupled via at least one switch to the first I/O management node. The method further provides identifying a failure in the first I/O management node related to processing the data for the I/O device and, in response to the failure, configuring the at least one switch to communicate the data for the I/O device with a second I/O management node of the plurality of I/O management nodes. The method also includes, in the second I/O management node and after configuring the at least one switch, executing a second application to manage the data for the I/O device.

In some implementations, the failure may be identified based on health check communications exchanged between the first I/O management node and the second I/O management node. These health check communications exchanged between the first I/O management node and the second I/O management node may comprise health check messages transferred from the second application to the first application over switches for the first I/O management node and the second I/O management node, and health check responses transferred from the first application to the second application over the switches for the first I/O management node and the second I/O management node.

In some examples, the health check communications occur at a greater frequency than data communications between the I/O device and the first application.

In some implementations, identifying the failure in the first I/O management node comprises one of identifying that a health check response is not received from the first application within a defined time period, or identifying that a health check response indicates an issue with the first application.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

FIG. 2 illustrates a method of operating an input/output management cluster according to one implementation.

FIGS. 3A-3C illustrate an operational scenario of operating an input/output management cluster to provide high availability to input/output devices according to one implementation.

FIG. 5 illustrates a timing diagram to identify a failure in processing data for an input/output device according to one implementation.

DESCRIPTION

Input/output (I/O) devices, such as sensors, actuators, and other robotic systems and measurement tools are highly prevalent in various industries of modern commerce. These industries include the manufacturing industry, the food and agriculture industry, smart cities, the power and energy industry, the transportation industry, the tourism and hotel management industry, and the like. To manage each of these I/O devices, an entity may employ a plurality of I/O management clusters, which communicate with a subset of I/O devices to process and manage data being transferred to and delivered from each of the I/O devices. These clusters may be placed in various geographic locations, permitting each of the clusters to manage I/O devices in proximity to the cluster. Further, by distributing the I/O management clusters, at least a portion of the data processing for the I/O devices may be provided at the edge of the network, rather than requiring large amounts of data to be supplied from the I/O devices to a centralized processing system in the cloud or a private data center for operations on the data.

In the present implementation, to ensure high availability for the I/O devices at each of the I/O management clusters, the clusters may employ multiple I/O management nodes. These I/O management nodes may include active nodes, which execute active applications to support data operations of the I/O devices, as well as standby nodes, which can execute secondary versions of each of the applications to support data operations of the I/O devices. For example, if a first active I/O management node encounters a failure, a second I/O management node, which is pre-provisioned as a standby application, may be initiated to provide the desired operation. These failures may include hardware failures, software failures, communication failures, or any other similar related failure for one of the I/O management nodes of the cluster.

Figure 1:
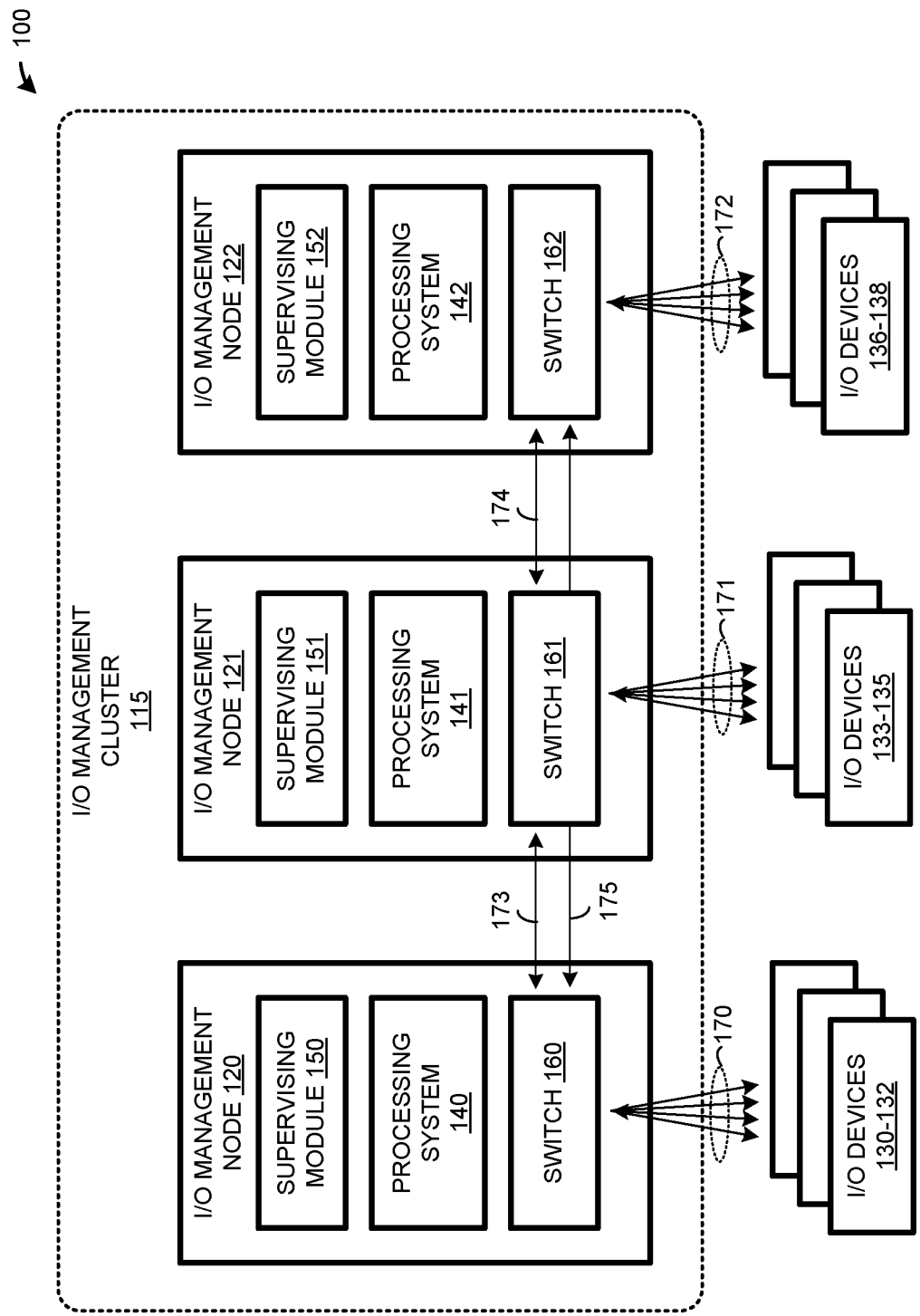
FIG. 1 illustrates a communication network for high availability data operations with input/output devices according to one implementation.

To further demonstrate the operations of an I/O management cluster with I/O management nodes, FIG. 1 is provided. FIG. 1 illustrates a communication network 100 for high availability data operations with I/O devices according to one implementation. Communication network 100 includes I/O management cluster 115 and I/O devices 130-138. I/O management cluster 115 further includes I/O management nodes 120-122, which further comprise supervising modules 150-152, processing systems 140-142, and switches 160-162. I/O management nodes 120-122 communicate with I/O devices 130-138 via switches 160-162 and communication links 170-172. Switches 160-162 further provide communications between each of the I/O management nodes via communication links 173-175.

I/O management cluster 115 is representative of a cluster that may be implemented by an entity, such as a manufacturing entity, a city, an energy producing entity, or some other similar entity. I/O management cluster 115 is representative of a single cluster for an entity, however, it should be understood that an entity may employ any number of clusters to support edge operations with I/O devices. Although not illustrated in the example of FIG. 1, it should be understood that I/O management cluster and its corresponding management nodes may be communicatively coupled to a network, permitting data corresponding to the I/O devices to be communicated with a central processing system for the entity and any corresponding management clusters. Further, this network connection may allow administrators of the entity to control operations of the individual I/O management nodes of the cluster.

In operation, I/O management nodes 120-122 may execute applications using processing systems 140-142 to manage incoming and outgoing data to I/O devices 130-138. These applications may comprise applications to gather and analyze data reported by the I/O devices, status information identified for each of the I/O devices, current operations being performed by the I/O devices, or any other similar data for the I/O devices. To communicate with the I/O devices, I/O management nodes 120-122 include switches 160-162. Switches 160-162 permit the exchange of data with I/O devices and further provide communications between each of the nodes of the cluster. Additionally, in many examples described herein, switches 160-162 provide a mechanism of time synchronized networking, which enables time division multiplexing of the data packet transmission over communication links 170-175. To provide this operation, the switches 160-162 may be programmed by the supervising modules 150-152, or by other administration systems, to allow specific non overlapping timeslots between any two pair of ingress, egress ports in the network. This mechanism enables a determinism for packet data transmission from the I/O devices 130-138, and further permits switches 160-162 to identify transmission delay incurred in the packet transmission that is several orders of magnitude faster than the processing dead line time required by the I/O devices 130-138. In some implementations, although not illustrated in the present example, at least one switch in switches 160-162 may be connected to a management service. This management service may be used to aggregate and monitor data retrieved from each I/O management cluster of the organizations network, modify and manage the operations on each I/O management cluster of the organizations network, or provide any other similar operations.

In the present implementation, the applications executing on I/O management nodes 120-122 may include primary applications, which are used during normal operation of the management nodes, and standby applications, which are pre-provisioned and used when one or more of the management nodes or primary applications encounters a failure. For example, processing system 140 may execute a primary version of an application for I/O device 130. Switches 160-162 are preconfigured to receive the data and for all the I/O device and forward the data only to the identified primary application. During the operation of the primary application, the application may encounter a software or hardware failure. In response to identifying the failure, supervising module 150, or in some examples an application executing on processing system 140, may initiate a switchover configuration of switches 160-162 to provide data communications of I/O device 130 to a second I/O management node of I/O management nodes 121-122 with a standby application for the device. Once the switches are configured, an application on the second I/O management node may be executed to provide the same operations as the primary application.

To further demonstrate the operations of communication system 100, FIG. 2 is provided. FIG. 2 illustrates a method of operating an I/O management cluster according to one implementation. The operations of FIG. 2 are referenced parenthetically in the paragraphs that follow, along with references to the elements and systems from communication system 100 of FIG. 1.

As described herein, one or more I/O management clusters may be deployed by an entity to monitor and manage I/O devices at the edge of the entities network. In the present implementation, the method of FIG. 2 includes, in a first I/O management node, executing a first application to manage data for an I/O device communicatively coupled via at least one switch to the first I/O management node (201). The method further provides identifying a failure in the first I/O management node related to processing the data for the I/O device (202) and, in response to the failure, configuring the at least one switch to communicate the data for the I/O device with a second I/O management node (203). The method also includes, in the second I/O management node and after configuring the at least one switch, executing a second application to manage the data for the I/O device (204).

In some implementations, to identify a failure in the first I/O management node related to processing the data for the I/O device, the first and the second I/O management node may be configured to communicate health check communications at defined intervals. For examples, the second I/O management node may transfer health check messages to the first I/O management node (to the switch, or to the main processing system of the node), and wait for a response from the node to determine if a response is received within a certain time frame, and whether the response indicates that the first I/O management node is operating as configured. In at least one example, the second I/O management node may transfer health check communications at a greater rate or frequency than the one or more I/O devices communicating with the first I/O management node. For instance, the second I/O management node may transfer a health check communications one hundred times more frequently than communications are made between the first I/O management node and the I/O devices, permitting the second I/O node to quickly identify issues with the first I/O management node between required communications with the I/O devices. Once an issue is detected, the second I/O management node may transition the associated I/O devices to communicating with the second I/O management node before the completion of the I/O devices' communication cycle.

In some implementations, the health check communications within a cluster may occur over time synchronized network that uses predefined network schedule to ensure that messages are not delayed in the network unless a failure occurred. Accordingly, even the loss or delay of a single health check communication between two entities or two nodes may result in a failover condition to the alternative node. For example, based on the scheduling, a reserve I/O management node may expect a health check response from a primary node during a first time period, but may fail to receive the response until a second time period. As a result, a failure could be identified as soon as the expiration of first time period, permitting a handover to be initiated as soon as the failure is identified. Additionally, because the health check communications may be exchanged at a much faster rate than the communications with the I/O devices, this may permit a quick identification of a failure between communications with an I/O device.

In some examples, the health check communications between the I/O management nodes may occur using the supervising modules, such that the supervising modules may transfer the health check messages to other applications and switches to determine if a failure has occurred. In other examples, applications themselves executing on processing systems 140-142 may transfer health check messages to other applications to determine if a failure has occurred. Thus, an application on processing system 141 may transfer a health check message over switches 160-161 to processing system 140 to determine if an application executing on processing system 140 is operating correctly.

As an illustrative example, referring to communication system 100, I/O management node 120 may execute an application for I/O device 130 using processing system 140. This application may comprise a virtual machine providing the operations for I/O device 130, may comprise an application operating on an operating system for I/O management node 120, or may comprise any other similar application. During the operation of the application, a failure may be encountered by I/O management node 120. This failure may include a hardware failure of I/O management node 120, a software issue with the application executing on I/O management node 120, a software issue with a host operating system for I/O management node 120, or a connectivity issue in transferring or receiving data from I/O device 130. In some examples, to determine the failure, a supervising module, such as supervising module 150 may be communicatively coupled to processing system 140 and/or switch 160. To determine failures for the applications and the management nodes, the supervising module may compare expected timing of data operations with the I/O devices and measured timing of data operations with the I/O devices. For example, if, at a first time, processing system 140 were expected to receive data from switch 160 corresponding to I/O device 130, but the data was not received until a second time that is later than the first time, supervising module 150 may identify this as a failure with the operation of the application on I/O management node 120.

In response to identifying the failure, supervising module 150 may initiate a configuration of at least switch 160, as well as switches 161 or 162 to defer communications to a second I/O management node capable of providing a platform for an application associated with I/O device 130. Once the switches are configured, the application may be executed on the second I/O management node to provide the desired data operations corresponding to the I/O device. In at least one implementation, the secondary node, such as I/O management node 121, may be configured with a standby application for the I/O device. Thus, once a failure is identified in the first node, supervising module 150 or some other notification process may notify processing system 141 on I/O management node 121 that the standby application is required for the operation of I/O device 130.

Figure 3C:
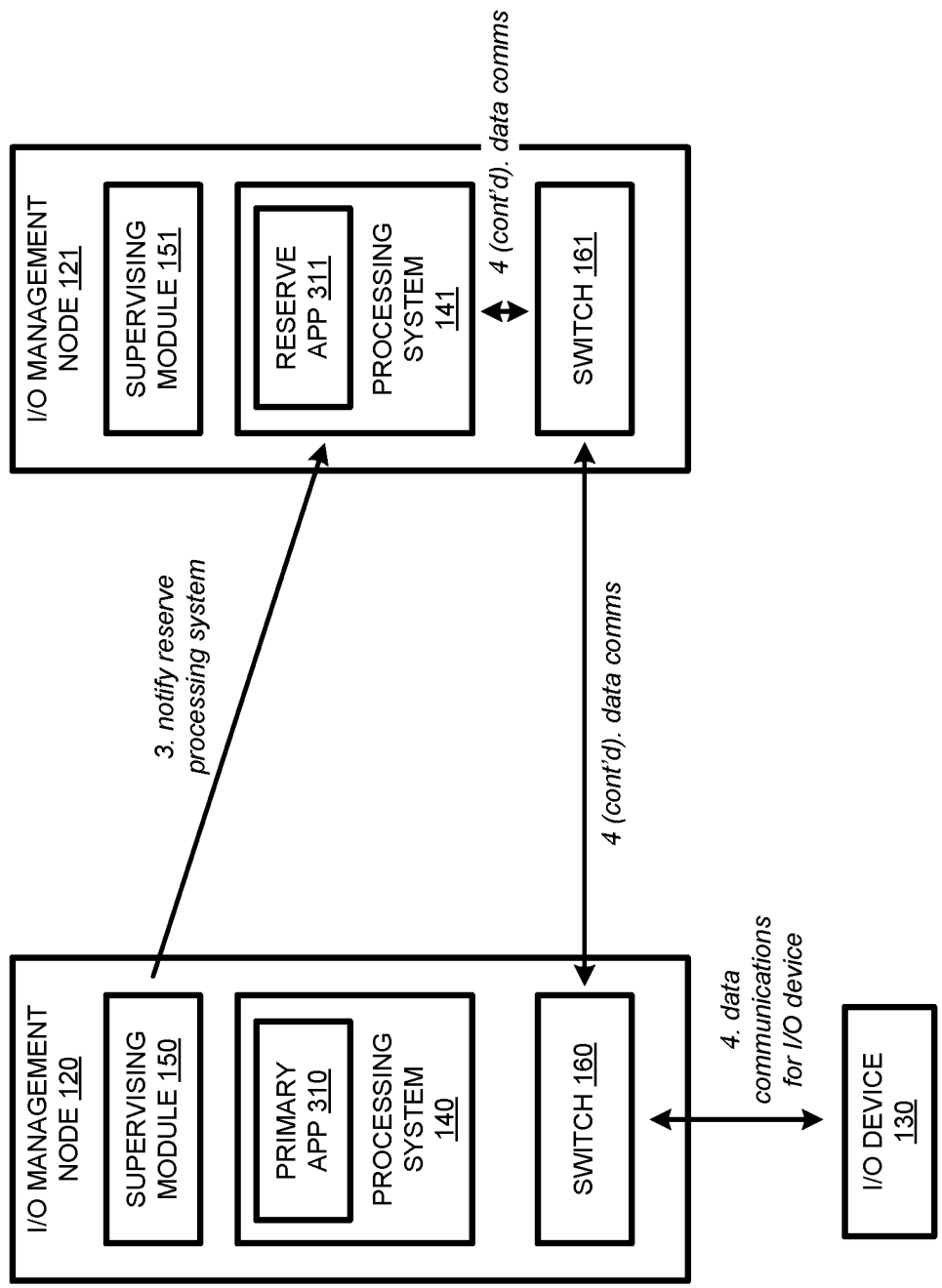

Referring to FIGS. 3A-3C, FIGS. 3A-3C illustrate an operational scenario of operating an input/output management cluster to provide high availability to input/output devices according to one implementation. FIG. 3A-3C include elements and systems from communication system 100 of FIG. 1. In particular, FIGS. 3A-3C include I/O management node 120-121, supervising modules 150-151, processing systems 140-141, switches 160-161, and I/O devices 130. Further, FIGS. 3A-3C include primary application 310 and reserve application 311 capable of providing the desired data operations with respect to I/O device 130.

Referring first to FIG. 3A, FIG. 3A illustrates the normal operation of I/O management nodes 120-121. In this particular example, I/O device 130 is communicatively coupled to switch 160, which provides communication operations, at step 0, between processing system 140 and the I/O device. The communication operations may transfer data from the I/O device, as well as provide data to the I/O device in some implementations. This data may include data for sensors, actuators, robotic instruments, or any other similar data corresponding to I/O device 130. During the operation of I/O device 130 with processing system 140, supervising module 150 may monitor the operations of the application and the data traces for the communications to determine any failures in the data operations. These failures include, failures of primary application 310, failures of processing system 140, failures in the communication path between I/O device 130 and processing system 140, or any other similar failure for I/O management node 120.

Turning to FIG. 3B, at step 1, supervising module 150 identifies a processing system failure with processing system 140. This failure may be determined based on an exchange with processing system 140 to monitor the operations of processing system 140, may be determined when primary application 310 is not executing at a proper instance, or may be determined when data communications occur at improper instances between I/O device 130 and processing system 140. Once identified, supervising module 150 on I/O management node 120 determines an alternative I/O management node to process the data for I/O device 130, and initiates, at step 2, a configuration of the required resources to provide the desired operations. Here, the configuration of the required resources includes configuring switches 160-161 to permit the exchange of data between processing system 141 and I/O device 130. In some implementations, this configuring may include providing permissions, addressing information, and the like for I/O device 130 to the switches for the exchange of communications.

In some implementations, supervising module 150 may be configured to perform health check communications with processing system 140 and switch 160 to determine if data operations are being processed as configured for I/O device 130. These communications may occur at a greater frequency than the communications made between I/O management node 120 and I/O device 130. For example, supervising module 150 may perform health check communications one hundred times between communications with I/O device 130. Consequently, when an issue is identified with processing system 140 and primary application 310, supervising module 150 may initiate the configuration of the communication path to reserve application 311 in the downtime between communications with I/O device 130. This configuration in the downtime of communications with the I/O device ensures that data operations with the I/O are not missed by the cluster.

In some implementations, the health check communications within a cluster may occur over time synchronized network that uses predefined network schedule to ensure that messages are not delayed in the network unless a failure occurred. Accordingly, even the loss of a single health check communication between two entities may result in a failover condition to the alternative node. Additionally, because the health check communications may be exchanged at a much faster rate than the communications with the I/O devices, this may permit a quick identification of a failure between communications with an I/O device.

Referring to FIG. 3C, once the switches are configured for the communications between the I/O device and the processing system, processing system 141 may be configured to execute reserve application 311 to support the operations with I/O device 130. In this particular example, I/O management node 120 notifies, at step 3, processing system 141 to initiate the operations of reserve application 311 with respect to I/O device 130. This notification may be transferred or communicated to I/O management node 121 via switches 160-161, and is communicated to processing system 141 between communications with I/O device 130, such that communications are not missed with I/O device 130. Once initiated, I/O device 130 may communicate with processing system 141 using both switch 160 and switch 161, at step 4. By providing multiple I/O management nodes, each with the capability of providing reserve operations for other management nodes, an I/O management cluster may maintain high availability when one or more of the I/O management nodes fail.

Although illustrated as transferring a communication from supervising module 150 to processing system 141, it should be understood that other mechanisms may also be used to notify processing system 141 to execute reserve application 311 for I/O device 130. For example, processing system 140-141 may exchange handoff operations to handoff the operations of primary application 310 to reserve application 311, such that reserve application 311 is prepared for the next communication with I/O device 130.

While illustrated in the examples of FIGS. 3A-3C as identifying a failure in supervising module 150, it should be understood that failures may also be identified using processing system 140 and/or processing system 141. For example, processing systems 140-141 may exchange health check communications at defined intervals. If one of the health check communications were either not received from I/O management node 120, or the health check response from I/O management node 120 indicated an issue with primary application 310, then a process may be initiated to handover the operations of primary application 310 to reserve application 311 operating on I/O management node 121. The loss of even one health check communication deterministically identifies some kind of communication failure as the time synchronized network guarantees a congestion free transmission media. This handover operation may include configuring switches 160-161 and, in examples where reserve application 311 does not execute until required, initiating the execution of reserve application 311. This configuring of reserve application 311 may occur between communications of I/O device 130, such that communications are not missed between I/O device 130 and the cluster.

Figure 4A:
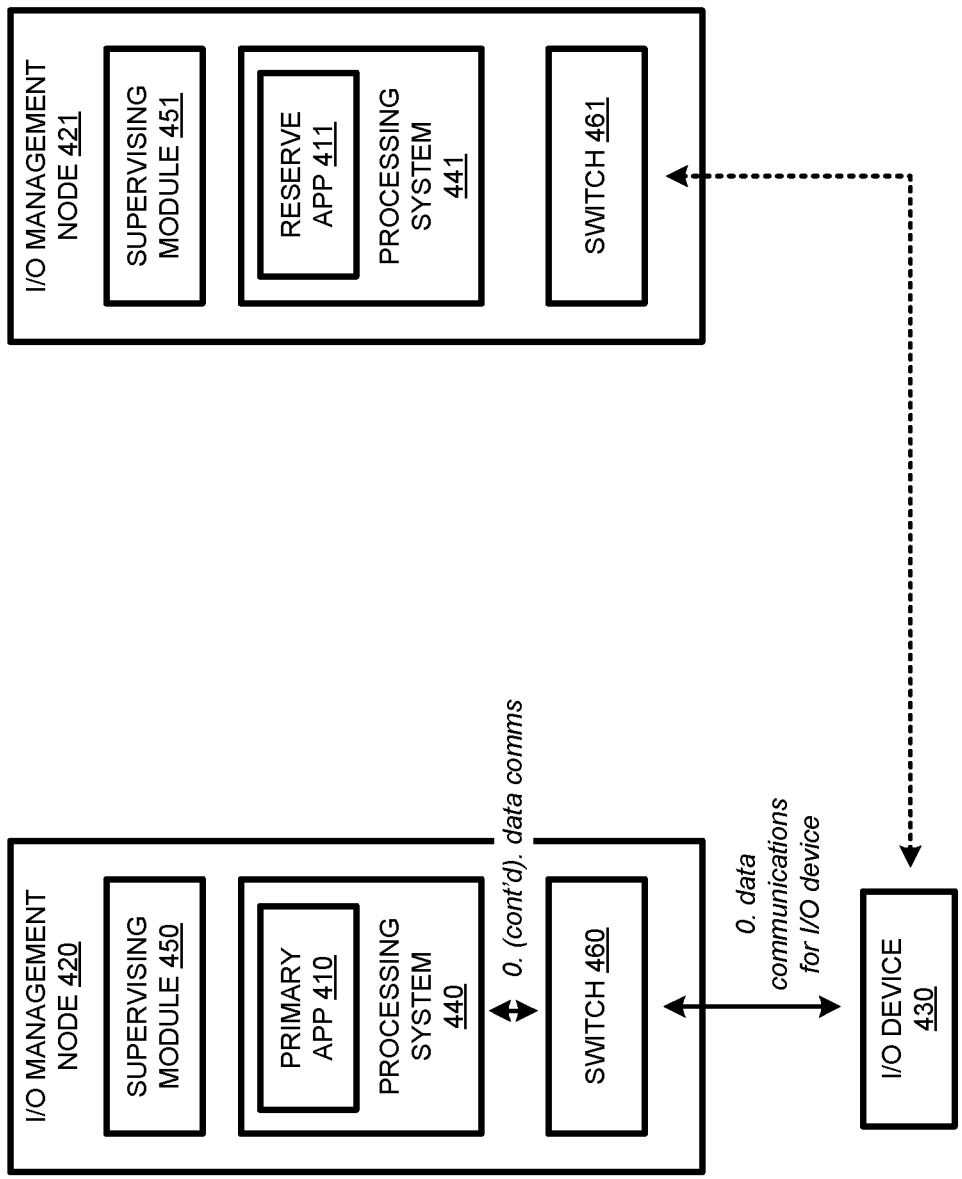
FIGS. 4A-4C illustrate an operational scenario of operating an input/output management cluster to provide high availability to input/output devices according to one implementation.
Figure 4B:
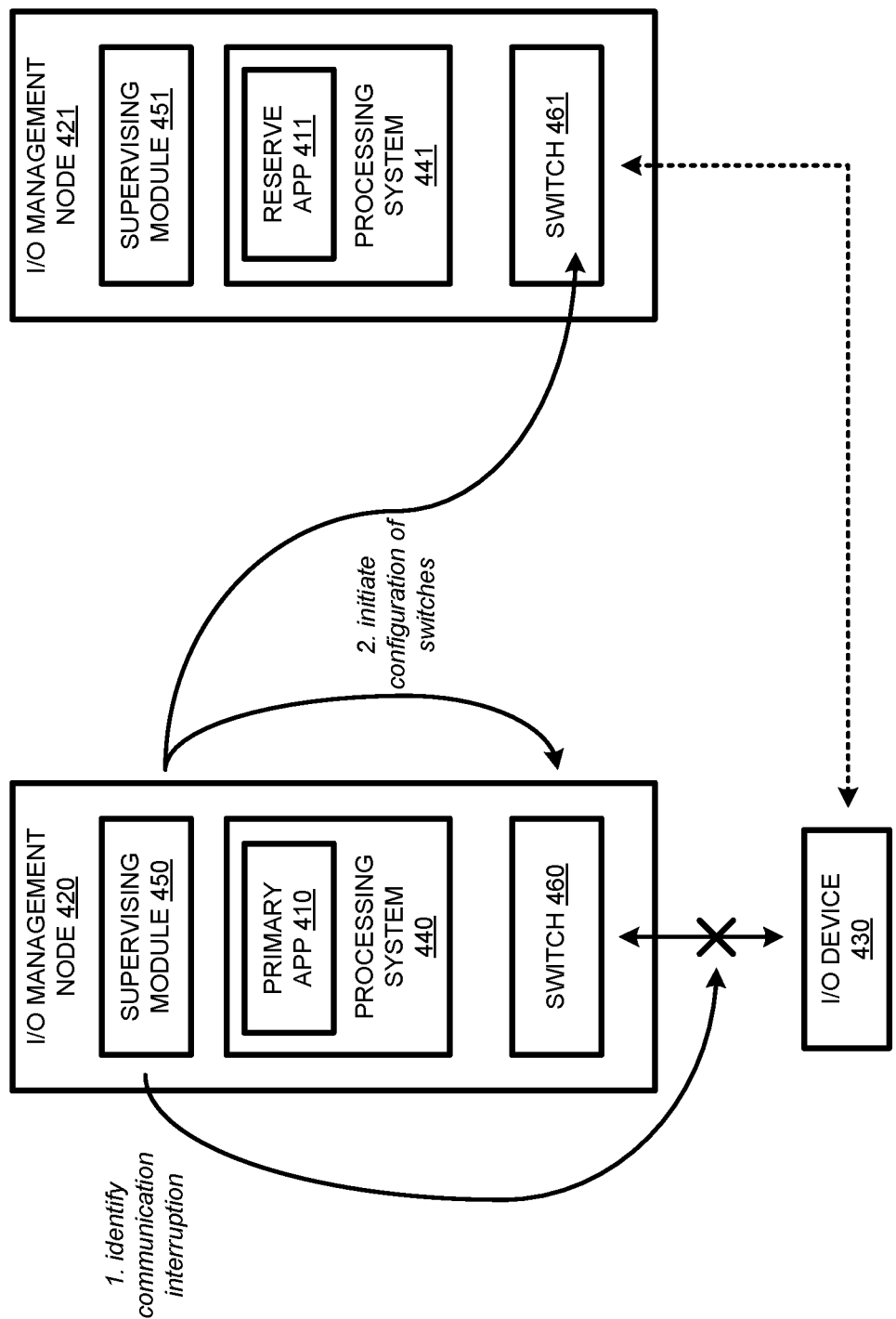
Figure 4C:
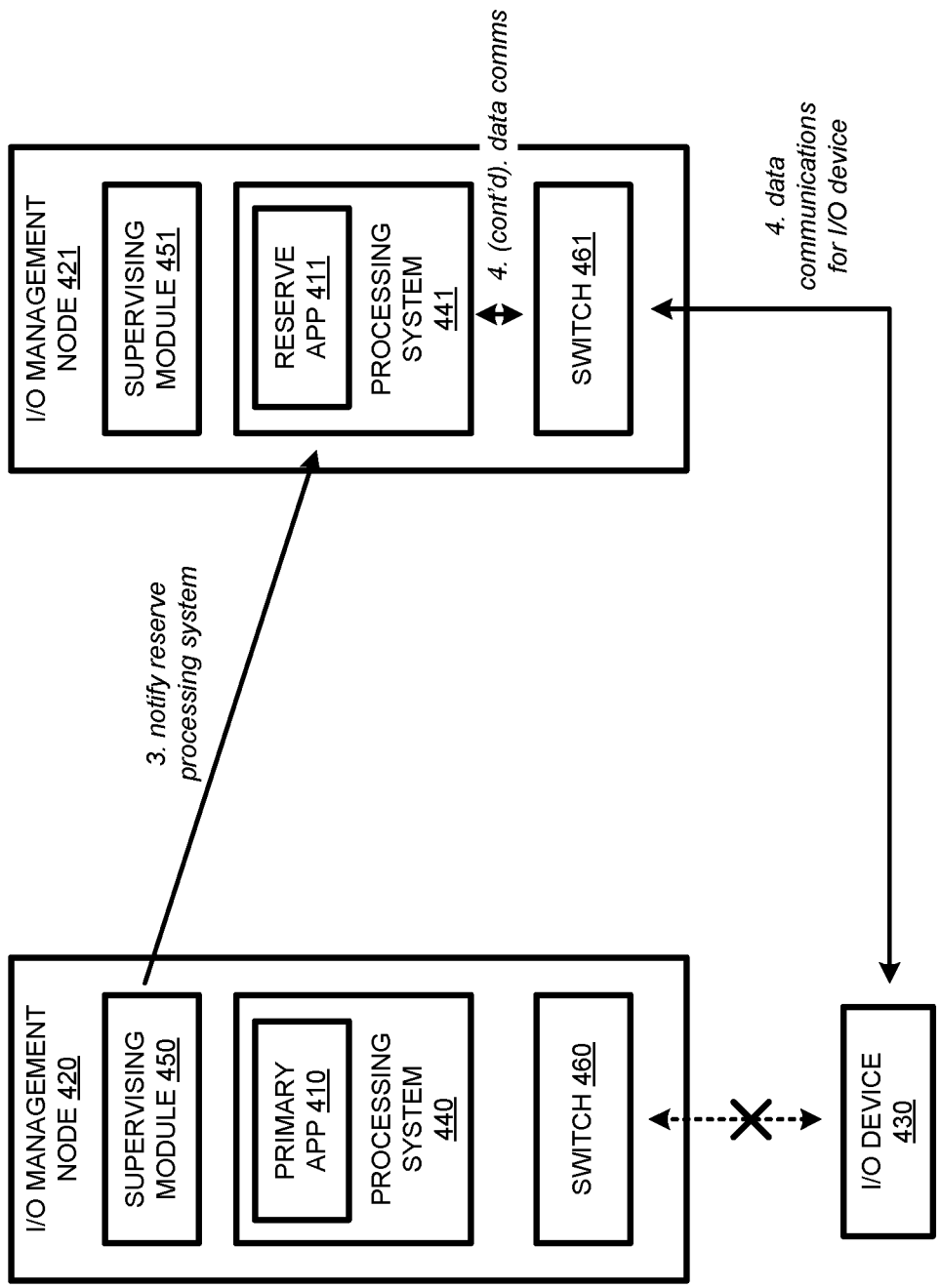

FIGS. 4A-4C illustrate an operational scenario of operating an input/output management cluster to provide high availability to input/output devices according to one implementation. FIGS. 4A-4C include I/O management nodes 420-421, and I/O device 430. I/O management nodes 420-421 are representative of computing hardware capable of providing high availability in an I/O management cluster, and include supervising modules 450-451, processing systems 440-441, and switches 460-461.

Referring first to FIG. 4A, I/O device 430 comprises a device with multiple interfaces capable of being connected to multiple I/O management nodes. Here, I/O device 430 is communicatively coupled to I/O management nodes 420 and 421 via switches 460-461. In the initial configuration, depicted in FIG. 4A, processing system 440 executes primary application 410 to communicate and process data with I/O device 430, at step 0. This primary application may include an application to process data measured by I/O device 430, manage status information for I/O device 430, transfer commands to I/O device 430 for operations, or any other similar application. In some implementations, primary application 410 may comprise an application operating on the host operating system of processing system 440. In other implementations, primary application 410 may comprise a virtual node (such as a virtual machine or container) operating on processing system 440 to provide the desired operations.

Turning to FIG. 4B, at step 1, supervising module 450 is configured to monitor the data communications with I/O device 430, and determine when a failure has occurred with the communications to and from I/O device 430. This failure may occur when it is detected that there is no longer a signal from I/O device 430, may occur when it is determined that data is not being transferred or received from I/O device at the appropriate instance, or may be determined based on any other similar operation. Once it is determined that there is a failure in the communication path with I/O management node 420, supervising module 450 may, at step 2, initiate a configuration of switches 460-461, permitting I/O device 430 to communicate with I/O management node 421 instead of I/O management node 420.

In some implementations, in configuring the handoff to an auxiliary I/O management node, supervising module 450 may be configured to identify a second management node of the cluster capable of executing a reserve application for the device. Once the node is identified, supervising module 450 may configure at least one switch in the cluster to communicate data for the I/O device with the appropriate management node with the reserve application. In the present example, I/O device 430 includes two communication interfaces each communicatively coupled to a different I/O management node. Because of this configuration, switch 460 is not required to forward communications to switch 461. Rather, I/O device 430 is relied upon to make the communications with switch 461.

In some examples, supervising module 450 may perform health check communications with processing system 440 and switch 460 to determine when an issue occurs. These health check communications may occur at a higher frequency than the communications between I/O management node 420 and I/O device 430. For example, the health check communication may occur one hundred times more frequently than communications to and from I/O device 430. Accordingly, when an issue is detected, supervising module 450 may initiate the transition to reserve application 411, such that reserve application is prepared to process data for the next communication with I/O device 430.

Referring to FIG. 4C, in addition to configuring the switches to provide the communications with I/O device 430, supervising module 450 may, at step 3, notify reserve processing system 441 that the I/O device will be communicating with I/O management node 421. At step 4, I/O device 430 may communicate data with reserve application 411 executing on processing system 441, wherein reserve application 411 may provide the operations that were formerly provided by primary application 410. This configuration limits downtime, as supervising module 450 is capable of preparing reserve application 411 prior to the next required communication with I/O device 430.

In some implementations, once the failure for I/O management node 420 is resolved, the data processing for I/O device 430 may be reverted to primary application 410. For example, if the communication link with switch 460 were reestablished, then supervising module 450 or some other monitoring process operating on the I/O management cluster may initiate a reverse operation to transition I/O device 430 from communicating with I/O management node 421 to I/O management node 420.

Although illustrated in the previous example as identifying a failure with I/O management node 420 using supervising module 420, it should be understood that other operations on I/O management node 420 may be responsible for determining whether there is a failure in the operation of the node. In some implementations, primary application 410 may exchange, at defined intervals, health check communications with reserve application 411. This health check information may be used to determine whether each of the applications is capable of servicing data operations with respect to I/O device 430. For example, if, during the exchange of health check information, reserve application 411 determines that responses are not being delivered from primary application 410 in an adequate time period, then reserve application 411 may initiate the transition of I/O device 430 from I/O management node 420 to I/O management node 421. This transition may include reserve application 411 or some other process on processing system 441 communicating with switches 460 and 461 to configure the communication with I/O device 430. Alternatively, the transition may include the reserve application notifying a supervising module, such as supervising module 450 or 451, to modify the communication configuration of switches 450-451. Once configured, reserve application 411 may supply the data operations with respect to I/O device 430.

FIG. 5 illustrates a timing diagram 500 to identify a failure in processing data for an input/output device according to one implementation. FIG. 5 includes a first axis with times 510-514, and includes a second axis with various elements of I/O management node 420 from FIG. 4 including switch 460, processing system 440, and primary application 410. The second axis further includes application management software 520, which may comprise an operating system for I/O management node 420, or a hypervisor executing on I/O management node 420 to provide the operations of primary application 410. FIG. 5 is an example of a preferred data transaction from I/O device 430 over a single period.

As depicted in FIG. 5, switch 460 receives a data communication at time A 510, and forwards the communication to processing system 440 at time B 511. Processing system then holds the communication until at least time D 513 where it is forwarded to application management software 520 by time E 514. Application management software 520 is then responsible for forwarding the data to primary application 410, where it is processed.

Here, each of the elements in the I/O management node 420 are provided with a defined time period to complete the data transaction with I/O device 430. By defining time periods for each of the operations, it becomes possible for a supervising process, such as supervising module 450, to determine when there is a point of failure within the I/O management node. For example, if application management software 520 did not receive the data from I/O device 430 until time E 514, then a failure may be identified in either processing system 440 or switch 460. This failure may include a physical issue with processing system 440 or switch 460, a software issue with processing system 440 or switch 460, or any other similar issue preventing the proper operation times on the data.

In some implementations, an administrator of the I/O management cluster may define the time periods for when data should be transferred or received from each of the devices. In other implementations, processing system 440 or supervising module 450 may learn or configure a schedule for each of the I/O devices to ensure that proper data communications are maintained for each of the connected I/O devices.

In some examples, timing diagram 500 is representative of predicted signal level communications with the I/O device. This predicted signal level is then compared to a detected signal level communications corresponding to communications physically received and processed by the I/O management node. If it is determined that the predicted communications match the detected communications, then no failure will be identified. In contrast, if the detected communications fail to match the predicted communications, then a failure will be identified for the I/O management node, and a process may be initiated to transition to a reserve application on a second node.

Figure 6:
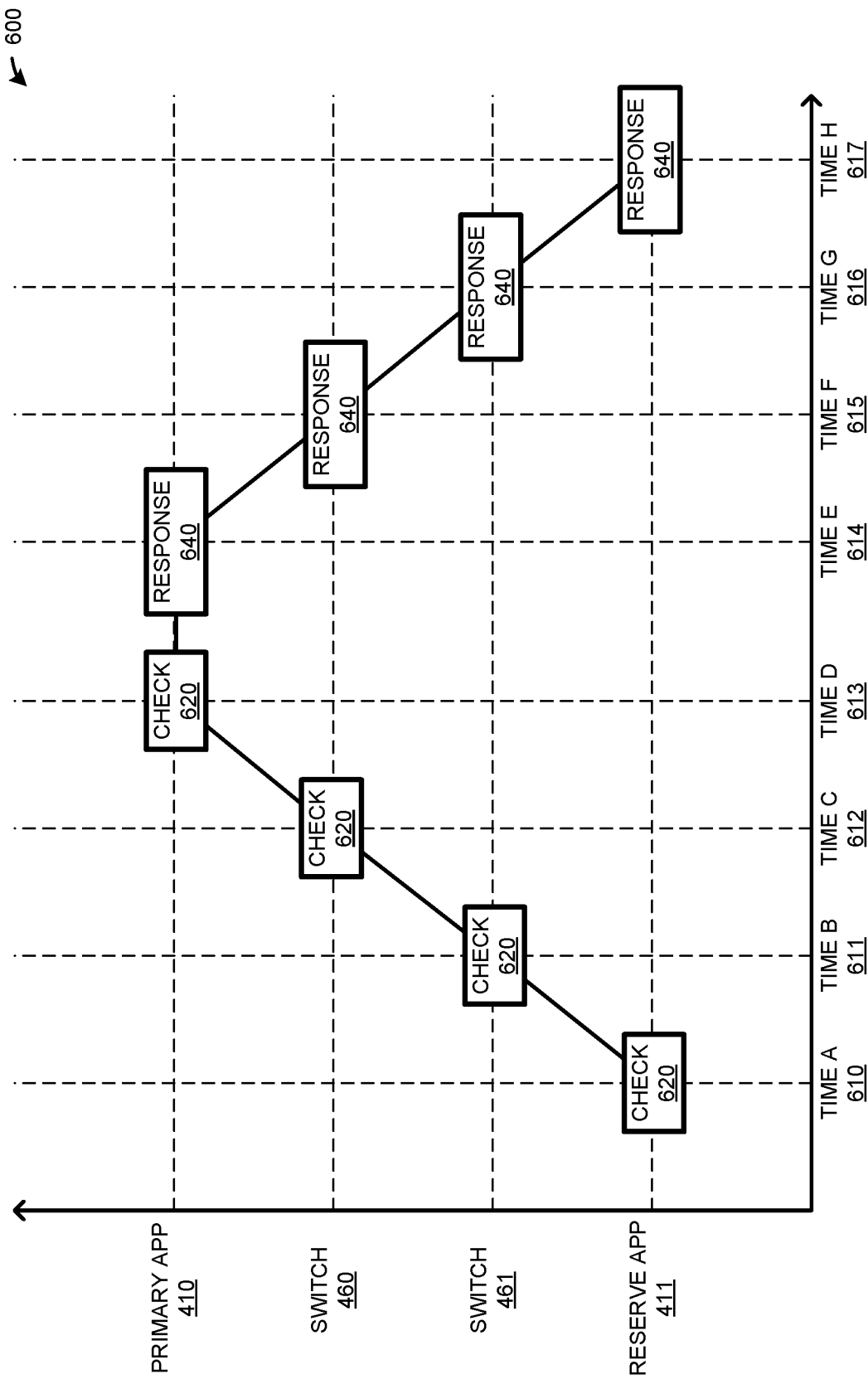
FIG. 6 illustrates a timing diagram to demonstrate a health check cycle between a primary application and a reserve application according to one implementation.

FIG. 6 illustrates a timing diagram 600 to demonstrate a health check cycle between a primary application and a reserve application according to one implementation. FIG. 6 includes a first axis with times 610-617, and includes a second axis with various elements of I/O management nodes 420-421 from FIG. 4. Specifically, the second axis includes primary application 410, switches 460-461, and reserve application 411 from FIG. 4.

As illustrated in timing diagram 600, reserve application 411 is used to monitor and ensure proper operation of primary application 410 on data from I/O device 430. To ensure the proper operation, reserve application 411, at defined intervals, may communicate a health check 620 over switches 461 and 460 to primary application 410, wherein the health check travels over times 610-613. In response to receiving the check, primary application 410 will generate a response 640 and transfer the response over switches 460 and 461 to be received reserve application 411, wherein the response is transferred over times 614-617. Based on the response, reserve application 411 may determine if primary application 410 is operating as directed. If a response is provided from primary application 410 indicating that the application is operating as directed, reserve application 411 may take no action on the current communication path. Instead, reserve application 411 may transfer a second health check request, at another defined interval to determine whether the application is continuing to operate as desired on I/O management node 420.

In contrast to a health response message from primary application 410 that indicates that primary application 410 is operating as desired, in some implementations, reserve application 411 may identify that there is an issue with primary application 410. This determination may be based on the information provided in the response from primary application 410, may be based on the lack of a response from primary application 410, or may be based on any other similar observation of the response. For example, after transferring the health check request 620, reserve application 411 may not receive a response from primary application 410 or may fail to receive the response within an allotted time period. Consequently, when a failure is identified with the response from the primary application, reserve application 411 may trigger a transition of the I/O device communicating with the primary application to the I/O device communicating with the reserve application.

In some implementations, to trigger the transition, reserve application 411 may be responsible for configuring the required switches for communication with the I/O device. In other implementations, reserve application may communicate with one or more other applications or external systems, such as a supervising module, to configure the switches for communication with the I/O device. Once configured, reserve application 411 may be used in the data operations with the I/O device, while primary application is prevented from communicating with primary application 410.

In some examples, the health check cycle or health check communication described above may be processed at a much higher frequency than communications with any corresponding I/O devices. For example, the health check cycle may occur one hundred times for every communication with the I/O devices. Accordingly, when an issue is detected by the health check messages, a configuration modification may be made, such that reserve application 411 is prepared to process communications for the I/O device prior to the next communication with the I/O device.

In some implementations, the health check communications within a cluster may occur over time synchronized network that uses predefined network schedule to ensure that messages are not delayed in the network unless a failure occurred. Accordingly, even the loss of a single health check communication between two entities may result in a failover condition to the alternative node. Additionally, because the health check communications may be exchanged at a much faster rate than the communications with the I/O devices, this may permit a quick identification of a failure between communications with an I/O device.

Although illustrated as exchanging the health check communications between applications on the I/O management nodes, it should be understood that supervising modules may also be used to exchange health check communications between the two I/O management nodes. Accordingly, a supervising module, such as those described in FIG. 1, may transfer a health check message to processing system 440 and switch 460 on I/O management node 420. Then, based on the health check response from I/O management node 420, may determine whether an issue is occurring with respect to the operations of primary application 410.

Figure 7:
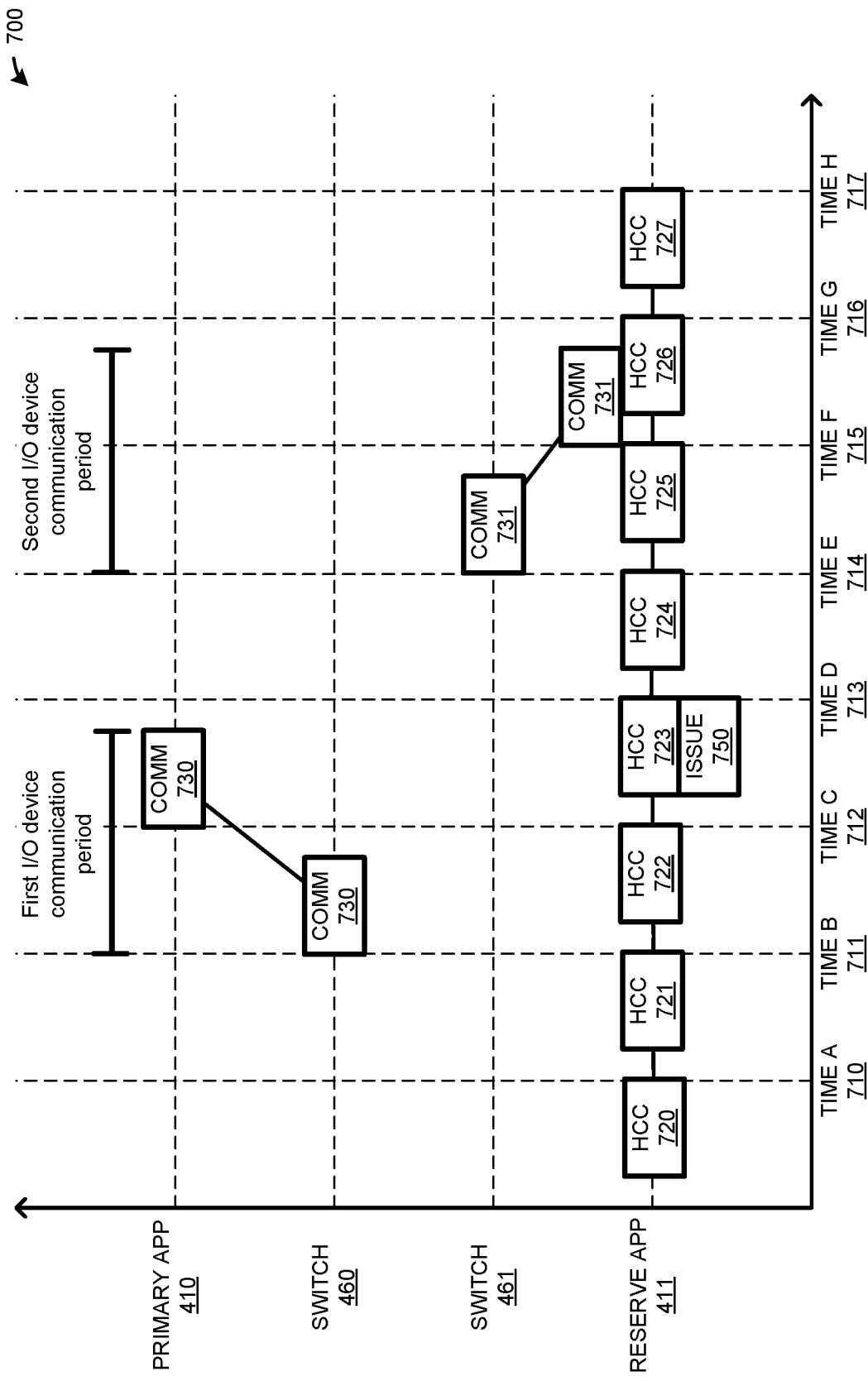
FIG. 7 illustrates a timing diagram to demonstrate health check communications between a primary application and a reserve application according to one implementation.

FIG. 7 illustrates a timing diagram 700 to demonstrate health check communications between a primary application and a reserve application according to one implementation. FIG. 7 includes a first axis with times 710-717, and includes a second axis with various elements of I/O management nodes 420-421 from FIG. 4. Specifically, the second axis includes primary application 410, switches 460-461, and reserve application 411 from FIG. 4.

In the example of FIG. 7, reserve application 411 exchanges health check communications (HCC) 720-727 with primary application 410 at defined time instances 710-717. In particular, as demonstrated in the example of FIG. 6, the health check messages may be transferred with expected transfer and return times, permitting errors to be identified when one of the HCC communications is not transferred or received within a defined time period. For example, if reserve application 411 does not receive a response message from primary application 410 within a defined time period after sending the health check message, then reserve application 411 may identify that there is a problem with primary application 410.

Here, two periods of communication are demonstrated of receiving data from an I/O device. The first period includes times 711-712, wherein switch 460 is configured to receive a data communication 730 from the I/O device and forward the communication to primary application 410. This is an example of the normal operation of interaction between the I/O management node and an I/O device. However, prior to the second period of communication with the I/O device, around time D 713, reserve application 411 identifies an issue 750 with the processing of the data by the primary application. This issue may be identified based on the content in HCC 723, or may be identified based on HCC 723 not returning within a defined time period. Once identified reserve application 411 may modify the communication path from the I/O device. In particular, rather than forwarding a communication from the I/O device to the primary application, switch 461 may be configured to forward the communication in the second period, represented by communication 731 to reserve application 411. Thus, reserve application 411 would receive the communication for processing at what would have been the same time as primary application 410 if the issue had not been identified.

As demonstrated in FIG. 7, the health check communications are transferred at a higher frequency than data is received from the I/O device. As a result, when issue 750 is detected by HCC 723, reserve application is capable of initiating the configuration of the cluster, such that no communications are missed from the I/O device.

Figure 8:
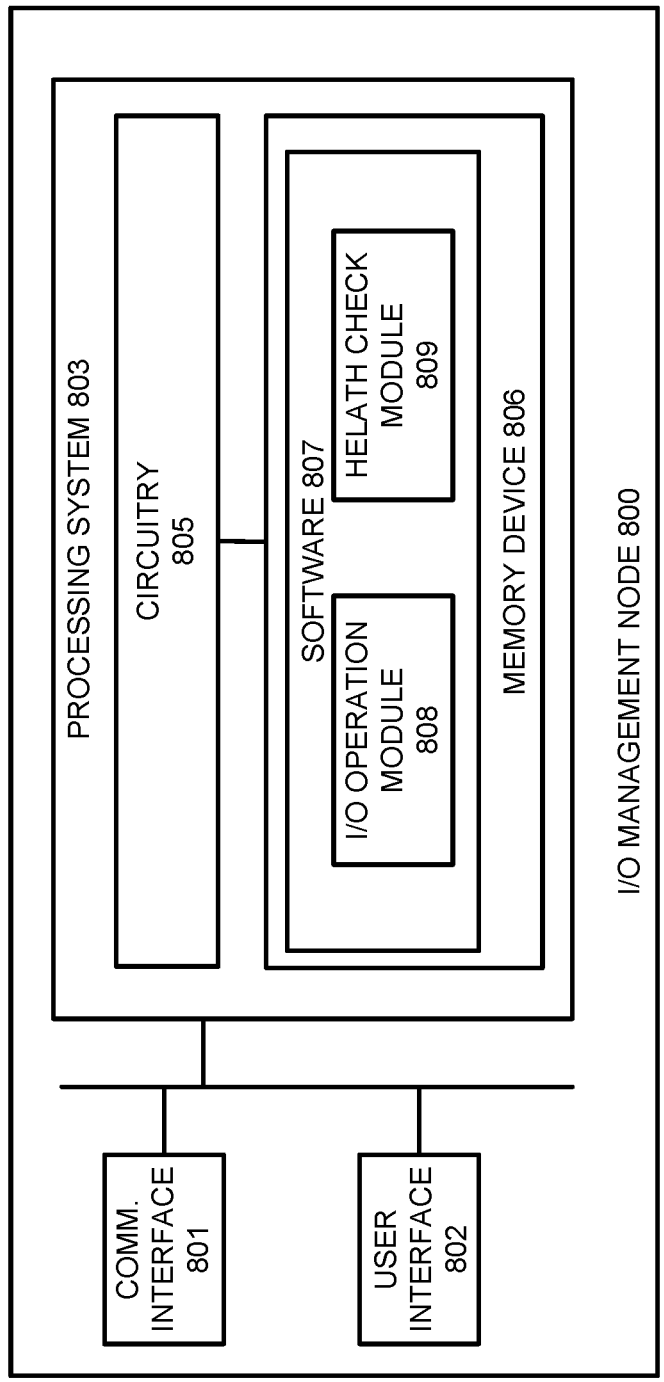
FIG. 8 illustrates an I/O management node according to one implementation.

FIG. 8 illustrates an I/O management node 800 according to one implementation. I/O management node 800 is representative of any computing system or systems with which the various operational architectures, processes, scenarios, and sequences disclosed herein for a messaging assistance service may be implemented. I/O management node 800 is an example of the I/O management nodes further described in FIGS. 1-7, although other examples may exist. I/O management node 800 comprises communication interface 801, user interface 802, and processing system 803. Processing system 803 is linked to communication interface 801 and user interface 802. Processing system 803 includes processing circuitry 805 and memory device 806 that stores operating software 807. I/O management node 800 may include other well-known components such as a battery and enclosure that are not shown for clarity.

Communication interface 801 comprises components that communicate over communication links, such as network cards, ports, radio frequency (RF), processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 may be configured to communicate with one or more edge I/O devices, which may include sensors, actuators, robotic elements, and other similar edge I/O devices. Further, communication interface 801 may be configured to communicate with other I/O management nodes of the I/O management cluster, and may be configured to communicate with a management service that can control and configure a plurality of I/O management clusters spread over one or more communication networks. For example, while the I/O management nodes provide some data operations at the edge of the network, the I/O management nodes may be configured to communicate at least a portion of the data over a network to a management service that aggregates control and data for multiple I/O management clusters in the organizations network.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes I/O operation module 808 and health check module 809 for an I/O device application, although any number of software modules may provide the same operation for a specific I/O application. Operating software 807 may further include an operating system, utilities, drivers, network interfaces, applications, or some other type of software. When executed by processing circuitry 805, operating software 807 directs processing system 803 to operate messaging assistance computing system 800 as described herein. Although illustrated with I/O operation module 808 and health check module 810 for a single I/O application, it should be understood that any number of I/O applications may execute on an I/O management node 800. Further, it should be understood that these applications may execute on a host operating system for I/O management node 800, or may execute as a virtual node (such as a virtual machine or Linux container) on the host operating system.

In a particular, example, I/O operation module 808 is configured to provide the required data operations with an I/O device capable of being communicated with using communication interface 801. These data operations may include operations on data received from the I/O device, operational status information for the I/O device, data to be transferred to the I/O device, or any other similar data operations with respect to an edge I/O device. In some implementations, the application associated with I/O operation module 808 may include a primary application, which processes data for the I/O device during normal operation, but may also represent a reserve application or secondary application capable of providing high availability in an I/O management cluster. In particular, the reserve application may be used when a primary application, executing on a separate I/O management node encounters a failure.

To identify and manage the handover operations between primary and reserve applications, the application includes health check module 809. Health check module 809 when read and executed by processing system 803 directs processing system to exchange, with a second application on a second I/O management node, health check and response messages to ensure that the application is executing properly. For example, if the application executed by processing system 803 comprises a reserve application capable of executing when a primary application encounters a failure, health check module 809, at defined intervals, may transfer a health check message over communication interface 801 to the I/O management node executing the primary application. Once transferred, health check module 809 directs processing system 803 to receive a health response from the I/O management node executing the primary application.

If the health response indicates that the application is operating properly on the second system, then no action may be taken in modifying the communication path. However, if a received health response indicates a failure, or no health response is received from the other I/O management node, then health check module 809 may initiate a handover of the I/O device from the primary application to the reserve application This handover may include configuring communication interface 801 to communicate with the required I/O device, configure a communication interface on the I/O management node with the primary application to no longer communicate with the node, notify a supervising module to configure one or more communication interfaces to permit the reserve application to process data for the I/O device, or some other configuration mechanism.

In many examples, the health check communications between the nodes occur at a higher frequency than communications between the I/O management node and the I/O device. For example, for every communication with an I/O device, the I/O management node may communicate one hundred health check communications. Accordingly, when an issue is detected, a transition to reserve I/O management node may be made prior to the next communication with the I/O device. This limits any downtime that may occur between the I/O device and an I/O management cluster.

Although not illustrated in the example, of I/O management system 800, it should be understood that in some implementations an I/O management node may include a supervising module, such as supervising modules 150-152 from FIG. 1. These supervising modules, which may include field programmable gate arrays (FPGAs), micro-controllers, or separate processing systems with software storage systems may monitor for failures within I/O management node 800. In some implementations, the supervising module may be communicatively coupled to data traces between communication interface 801 and processing system 803, wherein the supervising module may be capable of identifying errors in the data communications between two systems. These errors may include, but are not limited to, identifying a bad connection between the processing system and the communication interface, identifying a timing issue in the communications between the communication interface and the processing system, or identifying any other similar issues with the communication traces.

Once an issue is identified by the supervising module, the supervising module may identify a second I/O management node capable of executing a reserve application, and configure one or more switches or communication interfaces to support the communication with the reserve application over the primary application. Further, in some implementations, when a health check module or some other module operating on processing system 803 identifies a failure, the supervising module may be responsible for identifying the alternative I/O management node to process the data for the I/O device. For example, in response to identifying a failure, the supervising module may identify a second I/O management node capable of servicing the I/O device, and initiate configuration of one or more switches (I/O interfaces) to permit the second I/O management node to communicate with the I/O device. This configuration may include providing addressing and permissions information to switches to permit the communication with the second node with the second application. Additionally, in some implementations, the configuration may prevent the I/O device from communicating with the failed I/O management node by revoking permissions or addressing for the failed I/O management node.

Returning to the elements of FIG. 1, I/O management nodes 120-122 each include supervising modules 150-152, processing systems 140-142, and switches 160-162. Switches 160-162 are communicatively coupled to processing systems 140-142, wherein the processing systems each include a storage system, which may comprise dynamic random access memory (DRAM), solid state storage, disk storage, or other similar storage elements capable of storing software for execution by processing circuitry. In particular, the storage systems should include applications capable of providing data operations on I/O devices 130-138, wherein the applications may include primary applications and reserve applications to provide high availability.

In addition to processing systems 140-142, I/O management nodes 120-122 further include supervising modules 150-152. Supervising modules 150-152 may include FPGAs, micro-processors, and other similar processing circuitry, and may further include storage systems capable of storing program instructions or firmware for the processing circuitry. In some implementations, supervising modules 150-152 may be communicatively coupled to corresponding processing systems 140-142 and switches 160-162 to monitor data operations between the processing systems, the switches (I/O interfaces), and the I/O devices.

In some implementations, I/O management node 120-122 of I/O management cluster 115 may be implemented in a shared chassis, wherein the chassis permits expansion and/or removal of I/O management nodes as required for processing data for the end I/O devices. For example, if I/O management node 120 encountered an issue, a new I/O management node may be added to the cluster to continue the desired operation of the cluster.

I/O devices 130-138 may include sensors, such as temperature sensors, positioning sensors, and the like, actuators, machines, robotic systems, and other similar I/O devices at the edge of an organization network. I/O devices 130-138 may, in some implementations, each include processing systems, storage systems, sensing and motorized components, communication interfaces, or some other similar element.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions. Although not illustrated in the example of FIG. 1, it should be understood that additional communication links may be used to provide communications between the I/O management cluster and a management service, which can aggregate control and data collection for I/O management clusters that make up an organizations network.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating an input/output (I/O) management cluster, the I/O management cluster comprising a plurality of I/O management nodes, the method comprising the following steps:
   in a first I/O management node of the plurality of I/O management nodes, executing a first application to manage data for an I/O device communicatively coupled via at least one switch to said first I/O management node, wherein each I/O management node in the plurality of I/O management nodes comprises at least one switch;
   communicably coupling a supervising module to at least one switch interconnecting said I/O device and said first I/O management module, and triggering said supervising module to:
   compare an expected timing of a predetermined data operation directed to said first I/O management node from said I/O device, with a measured timing attributed to said data operation directed to said first I/O management node from said I/O device, and categorize said first I/O management node as a failure only in an event said measured timing is determined to be greater than said estimated timing; and
   compare a signal level corresponding to a communication directed to said first I/O management node from said I/O device, with a predicted signal level attributed to said communication between said first I/O management node and said I/O device; and categorize said first I/O management node as a failure only in an event said signal level corresponding to said communication is determined to be lesser than said predicted signal level;
   transmitting, from a predetermined second I/O management node to said first I/O management node, health check communications, at a rate always greater than at least a rate of communication between said I/O device and said first I/O management module;
   identifying said failure in said first I/O management node in respect of processing the data for said I/O device, further based on said health check communications exchanged between said first I/O management node and said second I/O management node, via switches corresponding to each of said first I/O management node and said second I/O management node;
   in response to said failure, dynamically reconfiguring said at least one switch to communicate the data for said I/O device to said second I/O management node; and
   in the second I/O management node and after reconfiguring said at least one switch, executing a second application to manage the data for said I/O device.

2. The method of claim 1, wherein the failure in the first I/O management node is indicated by one of a data path failure in communicating with the I/O device, a software failure for the first application, and a hardware failure for the first I/O management node.

3. The method of claim 1, wherein the health check communications exchanged between the first I/O management node and the second I/O management node comprise health check messages transferred from the second application to the first application over switches for the first I/O management node and the second I/O management node, and health check responses transferred from the first application to the second application over the switches for the first I/O management node and the second I/O management node.

4. The method of claim 3, wherein identifying the failure in the first I/O management node comprises the following steps:
   identifying that a health check response is not received from the first application within a defined time period; and
   determining that a health check response indicates an issue with the first application.

5. The method of claim 1, wherein said health check communications are exchanged over a time synchronized network configured in line with a predetermined network schedule, and wherein a deviation from said predetermined network schedule is categorized as said failure of said health check communication.

6. The method of claim 1 wherein the I/O device is one of a sensor, an actuator, and a robotic system.

7. An input/output (I/O) management cluster, said I/O management cluster comprising:
   a first I/O management node comprising a first processing system configured to execute a first application to manage data for an I/O device communicatively coupled to said first I/O management node;
   a second I/O management node comprising a second processing system configured to exchange health check communications with the first I/O management node;
   at least one switch communicably coupling said first I/O management node to said second I/O management node, and said I/O device to said first I/O management node, and said I/O device to said second I/O management node;
   a supervising module communicably coupled to said at least one switch interconnecting said I/O device and said first I/O management module, said supervising module configured to:
      compare an expected timing of a predetermined data operation directed to said first I/O management node from said I/O device, with a measured timing attributed to said data operation directed to said first I/O management node from said I/O device, and categorize said first I/O management node as a failure only in an event said measured timing is determined to be greater than said estimated timing; and
      compare a signal level corresponding to a communication directed to said first I/O management node from said I/O device, with a predicted signal level attributed to said communication between said first I/O management node and said I/O device; and categorize said first I/O management node as a failure only in an event said signal level corresponding to said communication is determined to be lesser than said predicted signal level; and
   wherein said second I/O management node is configured to:
      transmit to said first I/O management node, said health check communications, at a rate always greater than at least a rate of communication between said I/O device and said first I/O management module;
      identify said failure in said first I/O management node in respect of processing the data for said I/O device, based on said health check communications transmitted from said second I/O management node to said first I/O management node;
      dynamically reconfigure said at least one switch communicably coupling said I/O device to said first I/O management node, to communicate the data for the I/O device to the second I/O management node; and execute a second application to manage the data for the I/O device, subsequent to reconfiguring said at least one switch communicably coupling said I/O device to said first I/O management node.

8. The I/O management cluster of claim 7, wherein the health check communications exchanged between the first I/O management node and the second I/O management node comprise health check messages transferred from the second application to the first application, and health check responses transferred from the first application back to the second application.

9. The I/O management cluster of claim 7, wherein the health check communications are exchanged over a time synchronized network configured in line with a predetermined network schedule, and wherein the second I/O management node is configured to identify said failure of said first I/O management node only in an event when at least one health check communication deviates from said network schedule corresponding to said time synchronized network.

* * * * *